United States Patent
Kuo et al.

(10) Patent No.: US 8,281,008 B2
(45) Date of Patent: Oct. 2, 2012

(54) RESOURCE ALLOCATION APPARATUS, METHOD, AND COMPUTER READABLE MEDIUM THEREOF

(75) Inventors: Wen-Hsing Kuo, Taichung (TW); Yu-Ting Yao, Hualian (TW); Yi-Hsueh Tsai, Taipei County (TW); Chih-Chiang Hsieh, Kaohsiung County (TW); Te-Huang Liu, Taoyuan (TW); Wanjiun Liao, Taipei (TW)

(73) Assignee: Institute for Information Industry, Taipei (TW)

( * ) Notice: Subject to any disclaimer, the term of this patent is extended or adjusted under 35 U.S.C. 154(b) by 1036 days.

(21) Appl. No.: 11/680,224

(22) Filed: Feb. 28, 2007

(65) Prior Publication Data
US 2008/0126544 A1   May 29, 2008

(30) Foreign Application Priority Data
Nov. 23, 2006   (TW) .............................. 95143328 A (51) Int. Cl.
G06F 15/173 (2006.01)
G06F 15/16 (2006.01)

(52) U.S. Cl. .................. 709/225; 709/231; 709/229
(58) Field of Classification Search .................. 709/225
See application file for complete search history.

(56) References Cited

U.S. PATENT DOCUMENTS

| | | | |
|---|---|---|---|
| 5,408,244 A * | 4/1995 | Mackenzie | 343/872 |
| 6,731,620 B1 * | 5/2004 | Lim et al. | 370/335 |
| 2002/0138565 A1 * | 9/2002 | Kustov et al. | 709/203 |
| 2002/0141355 A1 * | 10/2002 | Struhsaker et al. | 370/280 |
| 2004/0042479 A1 * | 3/2004 | Epstein et al. | 370/432 |
| 2004/0176948 A1 * | 9/2004 | Oh et al. | 704/201 |
| 2004/0180696 A1 * | 9/2004 | Foore et al. | 455/561 |
| 2007/0115800 A1 * | 5/2007 | Fonseka et al. | 370/208 |
| 2009/0252093 A1 * | 10/2009 | Frenger | 370/329 |

* cited by examiner

*Primary Examiner* — Abdullahi Salad
*Assistant Examiner* — Richard G Keehn
(74) *Attorney, Agent, or Firm* — Patterson Thuente Christensen Pedersen, P.A.

(57) ABSTRACT

A resource allocation apparatus, method, application program, and computer readable medium thereof are provided. A plurality of data streams are transmitted to a plurality of receiving ends via a network resource, wherein each of the receiving ends has a subscribing status. Each of the data streams comprises a plurality of data layers. First, required data are sent to the receiving ends. Then, an efficiency ratio of each of the possible transmission combinations is dynamically calculated. Finally, data layers comprised in the possible transmission combination that has the greatest efficiency ratio are transmitted to the receiving ends. Efficiency ratios are calculated according to the whole network resource, the channels of the receiving ends, and the characters of the data streams. By the aforementioned arrangement, data layers received by the receiving ends can be adjusted dynamically. Thus, the efficiency of the network resource can be increased.

24 Claims, 5 Drawing Sheets

RESOURCE ALLOCATION APPARATUS, METHOD, AND COMPUTER READABLE MEDIUM THEREOF

This application claims priority to Taiwan Patent Application No. 095143328 filed on Nov. 23, 2006, the disclosures of which are incorporated herein by reference in its entirety.

CROSS-REFERENCES TO RELATED APPLICATIONS

Not applicable.

BACKGROUND OF THE INVENTION

1. Field of the Invention

The present invention relates to a resource allocation apparatus, method, and computer readable medium thereof; specifically, it relates to a resource allocation apparatus, method, and computer readable medium thereof for transmitting a plurality of data streams to a plurality of receiving ends via a network resource, each of the receiving ends having a subscribing status.

2. Descriptions of the Related Art

With the progress of technologies, nowadays people are able to exchange information through the Internet easily. However, wired networks provide limited number of access locations and unstable transmission quality due to their physical layouts. Consequently, wireless networks with mobility and convenience rise thereby. According to transmission distances, wireless networks are classified into Wireless Local Networks (WLANs), Wireless Metropolitan Area Networks (WMANs), and Wireless Wide Area Networks (WWANs). People in this industry, the government, and the academia establish various kinds of transmission protocols for different wireless networks, for example, a Wireless Fidelity (Wi-Fi) standard for the WLAN, a Worldwide Interoperability for Microwave Access (WiMAX) multicast, standard for the WMAN, and a third generation (3G) wireless communication technique for the WWAN.

Figure 1:
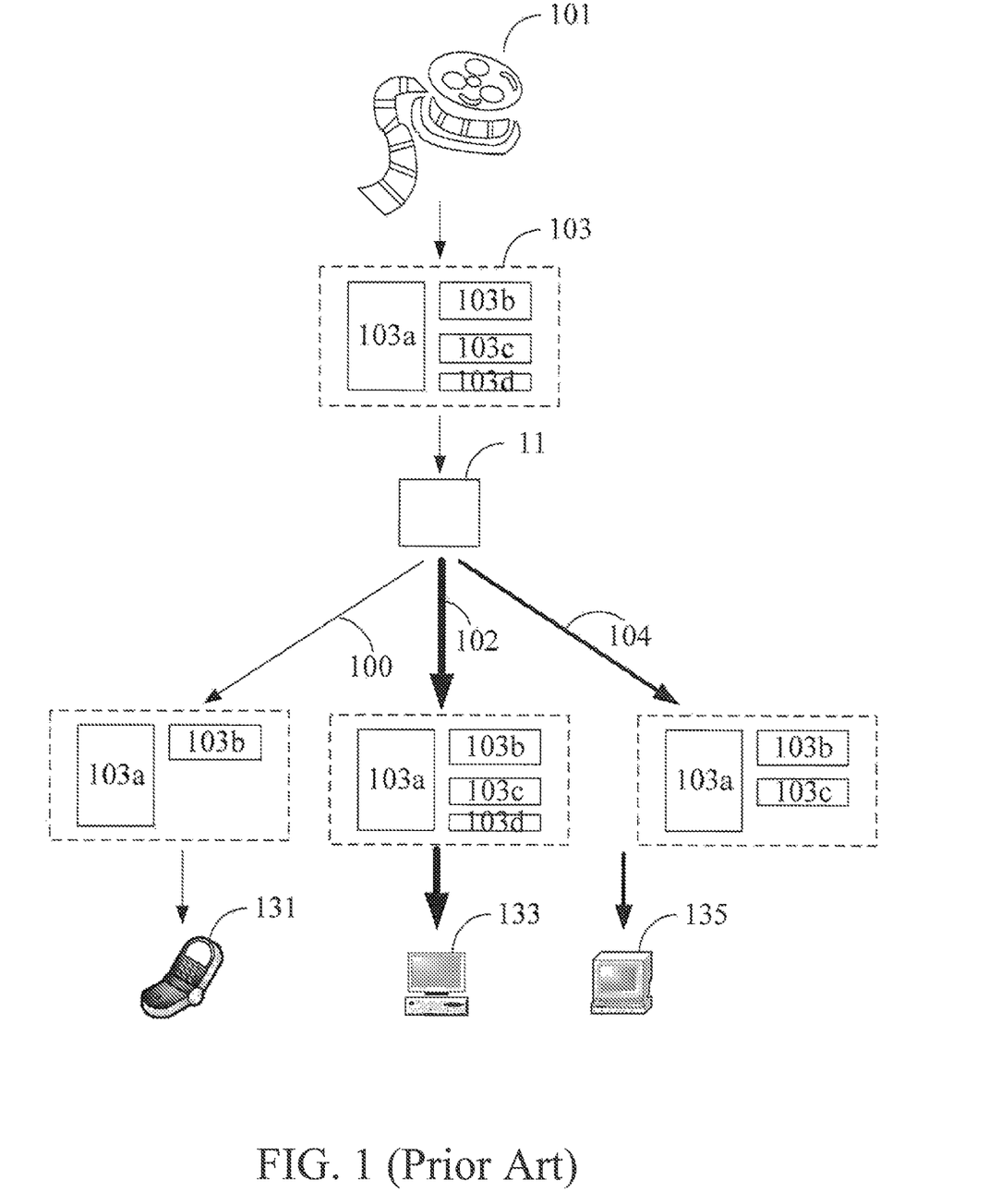
FIG. 1 is a schematic diagram of a conventional resource allocation system.

Compared with wired networks, bandwidths provided by wireless networks are much more limited. Consequently, when transmitting a large amount of data via a wireless network, such as a multimedia file, a technique of layered encoding before transmission is always required. The characteristic of a typical layered encoding technique is shown in FIG. 1. The layered encoding technique divides a multimedia data stream 101 into many smaller multimedia streams, i.e., many data, layers 103. Each of the data layers 103 is a data layer with different finenesses of a frame of the multimedia data stream 101. For a more detailed description, the data layers 103 comprises data layers 103a, 103b, 103c, and 103d, wherein data in the data layer 103a is a most rough one, and the data layers 103b, 103c, and 103d comprise different levels of finer data, respectively. To be more specific, with only the data layer 103a, a user can only see a most rough frame; with the additional data layer 103b, a user is able to see a slightly clearer and finer frame, and so on. That is, with different numbers of data layers, a frame with various qualities can be generated. Therefore, a transmitting end 11 can transmit, various numbers of data layers according to channel qualities of client ends 131, 133, and 135. For example, if a channel 102 of the client end 133 has a best quality, all the data layers 103a, 103b, 103c, and 103d can be received by the client end 133. If a channel 104 of the client end 135 has a second best, quality, data layers 103a, 103b and 103c can be received by the client end 135. If a channel 100 of the client end 131 has a worse quality, only data layers 103a and 103b can be received by the client end 131. In other words, client ends 131, 133, and 135 determines different combinations of the data layers according to the corresponding channel statuses or network qualities to obtain different qualities of the frame. By the layered encoding technique, multimedia services provided by the transmission end 11 become more flexible.

Currently, most wireless network standards support multicast. The multicast means that a receiving end can subscribe different programs (i.e. aforementioned data streams) from transmitting ends of certain groups. For example, with the characteristics of high speed transmission and wide range of WiMAX, a burst profile of a lowest bit rate of the same multicast group can be used to make all users in the group receive the data. Targets of multicast can be tens or even hundreds of users. In a multicast environment, the layered coding technique becomes more important.

Although the WiMAX specification supports a layered encoding mechanism to transmit each data layer to the client ends according to various channel statuses, it does not address multicast related mechanisms of the upper layers, such as group management, resource allocation, etc. Consequently, it is unable to analyze an internal flow rate of the network or a bandwidth ratio occupied by the protocol. Therefore, it is unable to precisely determine and locate problems while the network is abnormal.

Meantime, the flows of all client ends are concentrated on a channel. If the network resources are allocated according to a first come first service manner, some client ends may occupy most of the bandwidth and obtain complete information, while other client ends can not even obtain basic information. The situation makes the allocation of the network resources unreasonable. Even more, uncontrollable flows may often occur while the network is transmitting data. If it is unable to perform efficient bandwidth management for all client ends, resource access speeds of other client ends may be influenced.

According to the aforementioned description, current network transmission techniques do not provide any policy to allocate bandwidth for each user and each service stream while performing unicast, multicast or broadcast. Consequently, how to define a mechanism for network resource allocation management in order to achieve a reasonable bandwidth, flow, resource allocation, and dynamic adjustment according to various conditions is still an object for the industry to endeavor.

SUMMARY OF THE INVENTION

One objective of this invention is to provide a resource allocation apparatus for transmitting a plurality of data streams to a plurality of receiving ends via a network resource, and each of the receiving ends has a subscribing status. The resource allocation apparatus comprises a generation module, a calculation module, a selection module and a transmission module. The generation module is used for generating a plurality of possible transmission combinations according to the subscribing statuses. Each of the data streams comprises a plurality of data layers, each of the subscribing statuses is related to the data layers of each of the data streams, each of the possible transmission combinations comprises at least one layer of the data layers, and each layer of the at least one layer is corresponding to the at least one of the receiving ends. The calculation module is used for calculating a satisfactory degree and a resource consumption of each of the possible transmission combinations and for calculating an efficiency ratio according to each of the satisfactory degree and the corresponding resource consumption, wherein the resource consumption is less than the network resource. The selection module is used for selecting a possible transmission combination with a largest efficiency ratio to be a selected combination. The transmission module is used for transmitting the data layers of the selected combination to the corresponding receiving end.

Another objective of this invention is to provide a resource allocation method for transmitting a plurality of data streams to a plurality of receiving ends via a network resource, and each of the receiving ends has a subscribing status. The resource allocation method comprises the following steps of: generating a plurality of possible transmission combinations according to the subscribing statuses, wherein each of the data streams comprises a plurality of data layers, each of the subscribing statuses is related to the data layers of each of the data streams, each of the possible transmission combinations comprises at least one layer of the data layers, and each layer of the at least one layer is corresponding to the at least one of the receiving ends; calculating a satisfactory degree and a resource consumption of each of the possible transmission combinations; calculating an efficiency ratio according to each of the satisfactory degree and the corresponding resource consumption, wherein the resource consumption is less than the network resource; selecting a possible transmission combination with a largest efficiency ratio to be a selected combination; and transmitting the data layers of the selected combination to the corresponding receiving end.

Yet a further objective of the present invention is to provide a computer readable media to store an application program. The application program controls a resource allocation apparatus execute a resource allocation method. The resource allocation method transmits a plurality of data streams to a plurality of receiving ends via a network resource, and each of the receiving ends has a subscribing status. The resource allocation method comprises the following steps of: generating a plurality of possible transmission combinations according to the subscribing statuses, wherein each of the data streams comprises a plurality of data layers, each of the subscribing statuses is related to the data layers of each of the data streams, each of the possible transmission combinations comprises at least one layer of the data layers, and each layer of the at least one layer is corresponding to the at least one of the receiving ends; calculating a satisfactory degree and a resource consumption of each of the possible transmission combinations; calculating an efficiency ratio according to each of the satisfactory degree and the corresponding resource consumption, wherein the resource consumption is less than the network resource; selecting a possible transmission combination with a largest efficiency ratio to be a selected combination; and transmitting the data layers of the selected combination to the corresponding receiving end.

The present invention is able to adjust data layers transmitted to receiving ends dynamically for maximizing an efficiency function of the overall network according to overall network resources, network channel statuses of receiving ends, and characteristics of data stream (channel characteristics). By utilizing limited network resources, the present invention is able to allocate network resource in a most efficient approach, to prevent resource waste of wireless broadcast, and to obtain high flexibility of the system and high efficiency of resources.

The detailed technology and preferred embodiments implemented for the subject invention are described in the following paragraphs accompanying the appended drawings for people skilled, in this field to well appreciate the features of the claimed invention.

DESCRIPTION OF THE PREFERRED EMBODIMENT

Figure 2A:
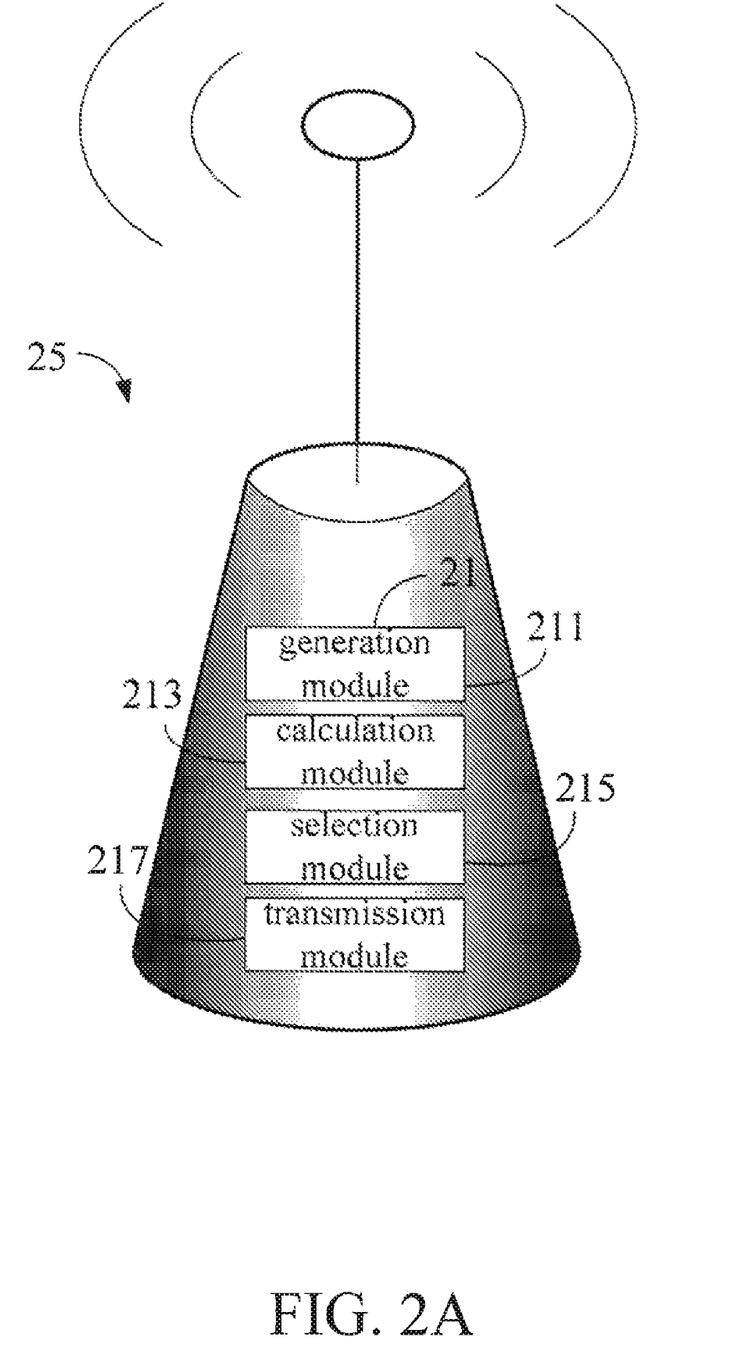
FIG. 2A is a schematic diagram of a resource allocation apparatus of the first embodiment of the present invention.
Figure 2B:
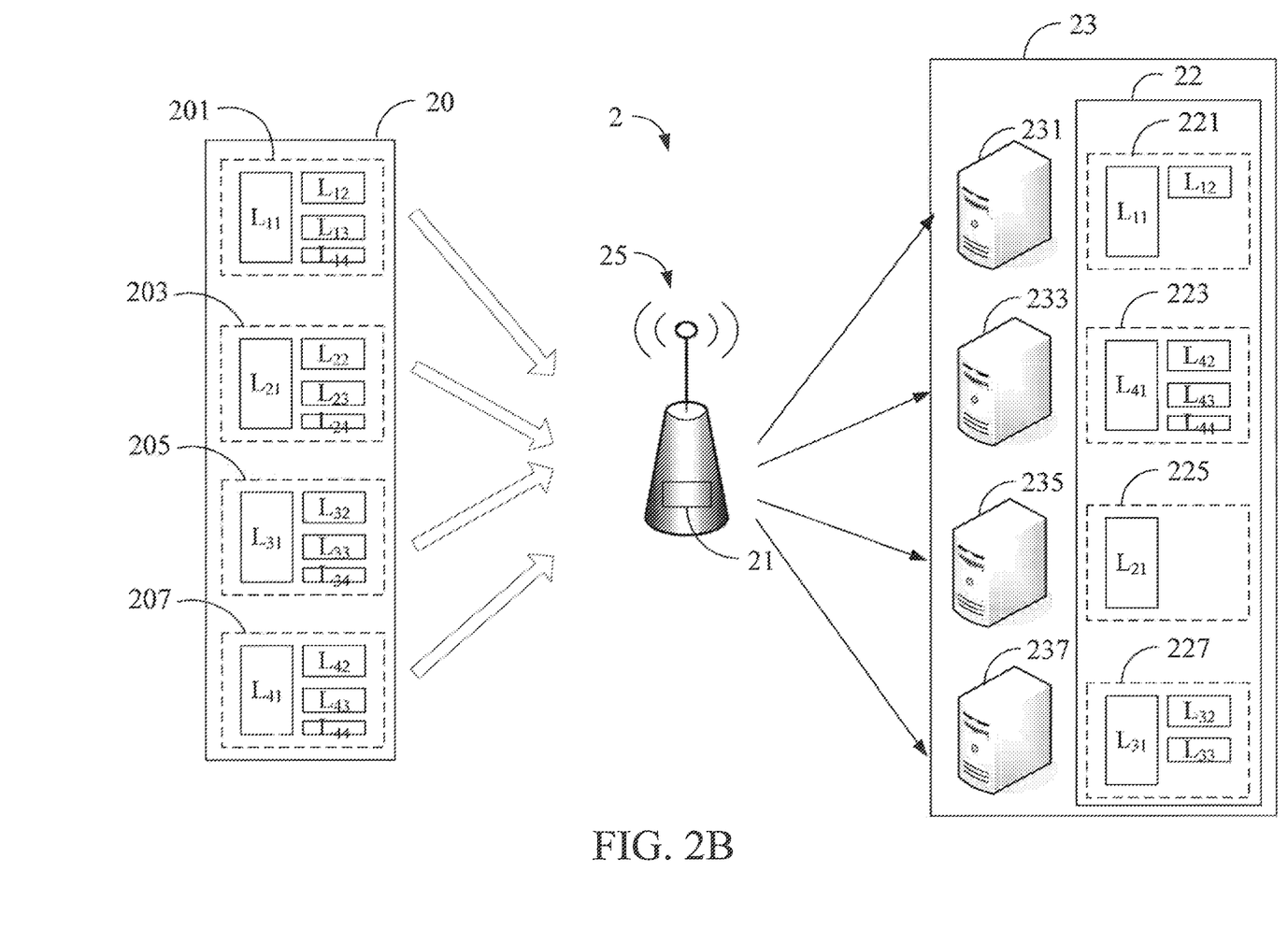
FIG. 2B is a schematic diagram of transmitting a subscribing status of the first embodiment of the present invention.
Figure 2C:
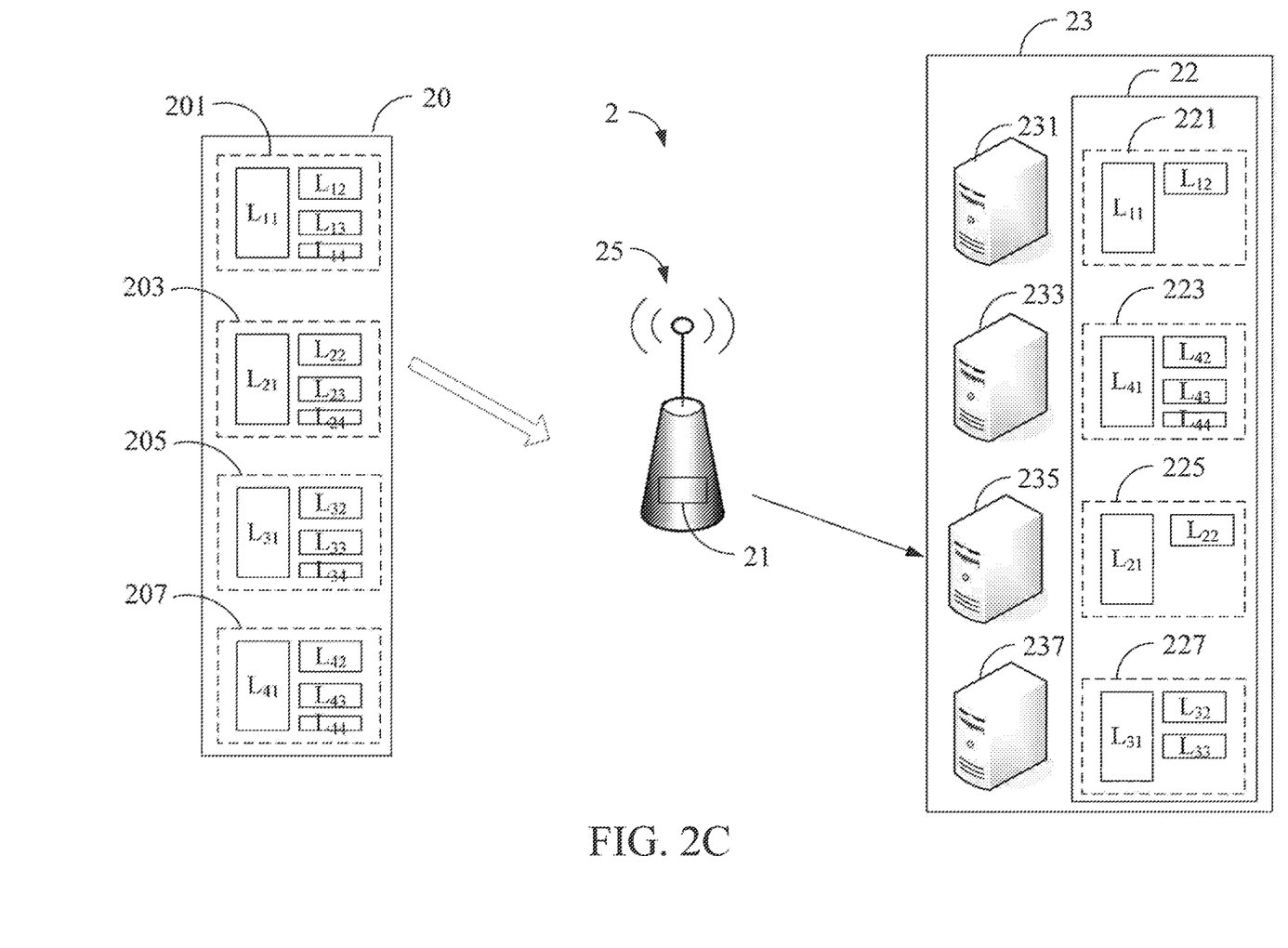
FIG. 2C is a schematic diagram of transmitting a selected combination of the first embodiment of the present invention.

A first embodiment of the present invention is shown in FIG. 2A, FIG. 2B and FIG. 2C. FIG. 2A shows a resource allocation apparatus 21 of the present invention. The resource allocation apparatus transmits a plurality of data streams 20 to a plurality of receiving ends 23 via a network resource, wherein each of the receiving ends 23 has a subscribing status 22. Each of the data streams 20 comprises a plurality of data layers and each of the subscribing status 22 relates to the data layers of the data streams 20. The data streams 20, the corresponding data layers, and the subscribing status 22 will be explained later.

The resource allocation apparatus 21 comprises a generation module 211, a calculation module 213, a selection module 215 and a transmission module 217 to complete the aforementioned resource allocation. The specific approach thereof will be explained later. In this embodiment, the resource allocation apparatus 21 is disposed, within a base station 25 via a software, hardware, or firmware manner to be installed on a hard disk drive, a memory, or an external controller of the base station 25. The point to be emphasized here is that the resource allocation apparatus 21 of the present invention is not necessary to be disposed within the base station 25. Instead, it can be simply disposed at a location so that, the resource allocation apparatus 21 is able to operate before the base station 25 transmits the data streams.

The first embodiment applies the resource allocation, apparatus 21 to an Internet Protocol Television (IPTV) system 2. Consequently, the data streams 20 are contents of digital TV programs. Assume that the data streams 20 comprise four data streams 201, 203, 205, and 207. Before transmitting the data streams 20, the TV station will divide each of the four data streams 201, 203, 205, and 207 into a plurality of data layers in advance. For example, the first data stream 201 is divided into four data layers $L_{11}$, $L_{12}$, $L_{13}$, and $L_{14}$, wherein the first data layer $L_{11}$ is a most coarsest portion of an image/video frame of the first data stream 201; the second data layer $L_{12}$ is a fine information of the image/video frame of the first data stream 201; the third data layer $L_{13}$ is a finer information of the image/video frame of the first data stream 201; and the fourth data layer $L_{14}$ is a finest information of the image/video frame of the first data stream 201. Relationships of the data layers $L_{11}$, $L_{12}$, $L_{13}$, and $L_{14}$ are that: appending the data layer $L_{11}$ to the data layer $L_{11}$ results in a clearer and finer image/video frame than image/video frame with only the data layer $L_{11}$, further appending the data layer $L_{13}$ to $L_{11}$ and $L_{12}$ results in an even clearer and finer image/video frame, and so on. In this embodiment, the data stream 203 is divided into $L_{21}$ and $L_{22}$ to $L_{24}$ by using the same technique; the data stream 205 is divided into $L_{31}$ and $L_{32}$ to $L_{34}$; and the data stream 207 is divided into $L_{41}$ and $L_{42}$ to $L_{44}$. The point to be emphasized here is that numbers of the data streams and numbers of data layers of each data stream of the present invention are used as an example only, and are not intend to limit the scope of the present invention.

Furthermore, numbers of data layers comprised in each data stream are not necessary to be the same. In this embodiment, the way to divide the data stream into the plurality of data layers is the same as the prior art, so the details are not described here. However, in physical operations, other ways may be adopted to divide the data stream into the data layers. In other words, a technique for dividing a data stream into a plurality of data layers is not intend to limit the scope of the present invention.

The subscribing statuses 22 represent contents of the subscribed programs of each of the receiving ends 23 representing subscribers. That is, a first receiving end 231 comprises a subscribing status 221, a second receiving end 233 comprises a subscribing status 223, a third receiving end 235 comprises a subscribing status 22S, and a fourth receiving end 237 comprises a subscribing status 227. For example, the first subscribing status 221 of the first receiving end 231 comprises the first data layer $L_{11}$ and the second data layer $L_{12}$ of the first data stream 201; the second subscribing status 223 of the second receiving end 233 comprises the first data layer $L_{41}$, the second data layer $L_{12}$, the third data layer $L_{43}$, and the fourth data layer $L_{44}$ of the fourth data stream 207; the third subscribing status 225 of the third receiving end 235 comprises the first data layer $L_{21}$ of the second data stream 203; and the fourth subscribing status 227 of the fourth receiving end 237 comprises the first data layer $L_{31}$, the second data layer $L_{32}$, and the third data layer $L_{33}$ of the third data stream 205.

A network resource is a network bandwidth indicating a total bandwidth of transmission channels of the base station 25 and the receiving ends 231, 233, 235, and 237. In this embodiment, the total bandwidth is 35 Gbps (gigabits per second). However, in other embodiment, the network resource can be defined as an access time. No matter what the network resource is defined as, it must be a finite value. In this embodiment, the multicast transmission is adopted for transmitting the data streams 231, 233, 235, and 237 to the receiving ends 23 of a certain group. More particularly, the data streams are transmitted via a Worldwide Interoperability for Microwave Access (WiMAX) technique.

At first, the transmission module 217 transmits a corresponding required data layer to each of the receiving ends 231, 233, 235, and 237 according to the corresponding subscribing status 221, 223, 225, and 227. The embodiment defines the required data layer as the data layers comprised in the subscribing status 221, 223, 225, and 227. That is, the subscribed data of the receiving end 231, 233, 235, and 237 is the required data layer of the corresponding receiving end. The point to be emphasized here is that the definition of the required data layer may be different in other embodiment, such as data layers of a single data stream. For example, the subscribing status of the receiving end 231, 233, 235, and 237 can be the $L_{11}$, $L_{11}$ and $L_{12}$, $L_{11}$, $L_{12}$, and $L_{13}$, and $L_{11}$ of the first data stream 201, respectively. The receiving end 231, 233, 235, and 237 can receive the same TV program content of the same TV station with different fineness. For another example, the required data layer can comprise only the first data layer $L_{11}$, $L_{21}$, $L_{31}$, and $L_{41}$ of each data stream 201, 203, 205, and 207. If the required data layer is the first data layer $L_{11}$, $L_{21}$, $L_{31}$, and $L_{41}$, respectively, all the receiving ends 23 are able to obtain basic information of the data stream 201, 203, 205, and 207. Even under a bad channel status, the receiving ends can roughly know the information of the data stream 20 simply by the required data layer. Generally speaking, the required data layer is transmitted in a slowest, bit rate and is compressed to a status with a highest false accept rate to minimize the affections by the communication quality.

Back to the condition of the first embodiment, i.e. the required data layer is the content of the subscribing status. The generation module 211 now generates a plurality of possible transmission combinations according to the subscribing status 211, 223, 225, and 227, and the channel statuses of the receiving end 231, 233, 235, and 237. Using the subscribing status 221 of the first receiving end 231 as an example, the first receiving end 231 has received the required data layer $L_{11}$ and $L_{12}$, so the un-received data layers are $L_{13}$ and $L_{14}$. Similarly, the un-received data layers of the third receiving end 235 are $L_{22}$, $L_{23}$, and $L_{24}$ according to the subscribing status 225 and the un-received data, layers of the fourth receiving end 237 is $L_{34}$ according to the subscribing status 227. The base station 25 determines that the channel status of the third receiving end 235 is worse than other receiving ends 231, 235, and 237 and is merely able to receive the second data layer $L_{22}$. Meantime, the channel statuses of other receiving end 231, 235, and 237 are good. The plurality of possible transmission, combinations are shown in the following table, which comprises 11 possible transmission combinations, wherein the symbol "---" represents no transmission.

| | $1^{st}$ receiving end | $2^{nd}$ receiving end | $3^{rd}$ receiving end | $4^{th}$ receiving end |
|---|---|---|---|---|
| subscribing status | $L_{11}$ and $L_{12}$ | $L_{41}$, $L_{42}$, $L_{43}$, and $L_{44}$ | $L_{21}$ | $L_{31}$, $L_{32}$, and $L_{33}$ |
| $1^{st}$ possible transmission combination | $L_{13}$ | — | — | — |
| $2^{nd}$ possible transmission combination | $L_{13}$ and $L_{14}$ | — | — | — |
| $3^{rd}$ possible transmission combination | — | — | $L_{22}$ | — |
| $4^{th}$ possible transmission combination | — | — | — | $L_{34}$ |
| $5^{th}$ possible transmission combination | $L_{13}$ | — | $L_{22}$ | — |
| $6^{th}$ possible transmission combination | $L_{13}$ | — | — | $L_{34}$ |
| $7^{th}$ possible transmission combination | $L_{13}$ and $L_{14}$ | — | $L_{22}$ | — |
| $8^{th}$ possible transmission combination | $L_{13}$ and $L_{14}$ | — | — | $L_{34}$ |
| $9^{th}$ possible transmission combination | — | — | $L_{22}$ | $L_{34}$ |
| $10^{th}$ possible transmission combination | $L_{13}$ | — | $L_{22}$ | $L_{34}$ |
| $11^{th}$ possible transmission combination | $L_{13}$ and $L_{14}$ | — | $L_{22}$ | $L_{34}$ |

The calculation module 213 first calculates a satisfactory degree and a resource consumption of each of the possible transmission combinations. The satisfactory degree of each of the possible transmission combinations is calculated according to the equation of $$\sum_{k=1}^{Ni}(u_k^i \times n_k^i).$$

In the aforementioned equation, k denotes an index of the at least one layer of the data layers of each of the possible transmission combinations, $N_i$ denotes a number of the at least one layer of each of the possible transmission combinations, $u_k^i$ denotes a weight of each of the at least one layer of each of the possible transmission combinations, $n_k^i$ denotes a number of the receiving ends 23 corresponding to each of the at least one layer of each of the possible transmission combinations, wherein the weight $u_k^i$ is a predetermined parameter relating to a peak signal to noise ratio (PSNR) of the data layers. In other embodiments, the weight $u_k^i$ can be determined according to one of a mean opinion score (MOS), a sampling ratio of program image data pixels, program image data quality, or a combination thereof. Furthermore, the value of $n_k^i$ relates to a receiving ability of each of the receiving ends 23, specifically to a signal to noise ratio (SNR) of the channel status of the receiving end. In other embodiments, the value of can be determined according to one of a burst profile, codec information, or a combination thereof, wherein the burst profile is adapted for a transmission service of the WiMAX, and the codec information is adapted for other network transmission senders.

Take the eleventh possible transmission combination as an example, $N_{11}$ equals to 4, meaning that there are four data layers ($L_{13}$, $L_{14}$, $L_{22}$, and $L_{34}$). Each of these four data layers corresponds to a weight. In this embodiment, no matter which data stream it is, the weight of the first data layer is 60%, the weight of the second data layer is 25%, the weight of the third data layer is 10%, and the weight of the fourth data layer is 5%. Consequently, the weights corresponding to the four data layers $L_{13}$, $L_{14}$, $L_{22}$, and $L_{34}$ of the eleventh possible transmission combinations are 10%, 5%, 25% and 5%, respectively. On the other hand, each, of the four data layers $L_{13}$, $L_{14}$, $L_{22}$, and $L_{34}$ also has a corresponding number $n_k^i$ of the receiving end. Since factors that are taken into consideration of this embodiment are simpler, the numbers are all set as 1. If it is assumed that the fourth receiving end 237 subscribes the first data stream 201 instead of the third data stream 205, then $L_{34}$ will be replaced by $L_{14}$ and the number of the receiving end corresponding to the data layer $L_{14}$ of the eleventh possible combination is 2.

The resource consumption, $B_i$, represents resource consumption of each of the possible transmission combinations and the value thereof relates to a bandwidth. In the first embodiment, the resource consumption of each of the first, data layer $L_{11}$, $L_{21}$, $L_{31}$, and $L_{41}$ is 4 Gbps, the resource consumptions of each of the second data layer $L_{11}$, $L_{22}$, $L_{32}$, and $L_{42}$ is 3 Gbps, the resource consumptions of each of the third data, layer $L_{13}$, $L_{23}$, $L_{33}$, and $L_{43}$ is 2 Ggbs, and the resource consumptions of each of the fourth data layer $L_{34}$, $L_{24}$, $L_{34}$, and $L_{44}$ is 1 Gbps. If the network resource is defined as an access time in another embodiment, the network resource is a number of time slots.

The calculation module 213 then calculates an efficiency ratio for each of the possible transmission combinations according to the corresponding satisfactory degree and the corresponding resource consumption. The calculation is based on the following equation $$R_i = \frac{\left[\sum_{k=1}^{Ni}(u_k^i \times n_k^i)\right]}{B_i},$$

wherein $R_i$ denotes the efficiency ratio of each of the possible transmission combinations. Although the satisfactory degree increases every time a receiving end is added, the corresponding resource consumption increases as well. Consequently, the efficiency ratio represents how to achieve a maximum efficiency of the data stream transmission with determined resource consumption.

The selection module 215 is configured to select one of the possible transmission combinations with a largest efficiency ratio among all the efficiency ratios $R_i$ as a selected combination. That is, adopting one of the possible transmission combinations for transmitting to achieve a maximum efficiency of the data stream transmission. While selecting the possible transmission combinations, it requires to determine whether the resource consumption of the possible transmission combinations corresponding to the largest efficiency ratio is smaller than the network resource at that time. In other words, when current network resources are not enough to provide the required resource consumption of the selected combination, the resource allocation apparatus 21 then selects the possible transmission combinations with a second maximum efficiency ratio and its resource consumption has to be smaller than the network resources at that time. In this embodiment, the remaining network resource is 14 Gbps after the base station transmits the required data layers to the receiving end 231, 233, 235 and 237. Among each of the possible transmission combinations with the resource consumption smaller than 14 Gbps, an efficiency ratio of transmitting the second data layer $L_{22}$ of the second data stream 203 to the third receiving end 235 (the third combination) is the largest one (25%*÷3 Gbps≈8.33%/Gbps), as shown in FIG. 2C.

Next, the transmission module 217 encodes the data layers comprised in the selected combination according to the channel statuses and transmits the encoded data layers to the corresponding receiving end 23 under different false accept rate and different transmission rate, i.e., to transmit the second data layer $L_{22}$ to the third receiving end 235. Generally speaking, a better channel status has a lower false accept rate and a faster transmission rate, and a worse channel status has a higher false accept rate and a slower transmission rate.

Next, the generation module 211 may generate another plurality of possible transmission combinations according to the transmitted selected combination with the largest efficiency ratio and the channel status of the receiving end 23 again. The calculation module 213 may calculate a satisfactory degree and resource consumption for each of another plurality of possible transmission combinations, and further calculate an efficiency ratio of each of the possible transmission combinations according to each calculated satisfactory degree and corresponding resource consumption.

The selection module 215 may further select one of the possible transmission combinations corresponding to the largest efficiency ratio as a selected combination. Later, the transmission module 217 may perform the coding compression for the data layers, comprised in the selected combination with the maximum efficiency ratio, and transmits to corresponding receiving end 23.

The resource allocation apparatus 21 may continuously perform operations of generating, calculating, selecting, and transmitting until a resource consumption of final selected possible transmission combinations is smaller than or equal to available network resource at that time. In other words, when remaining network resource is not enough to provide required resource consumption of the following transmission or the network resource is exhausted, the resource allocation apparatus 21 no longer performs resource allocation and stops transmitting data streams.

Figure 3:
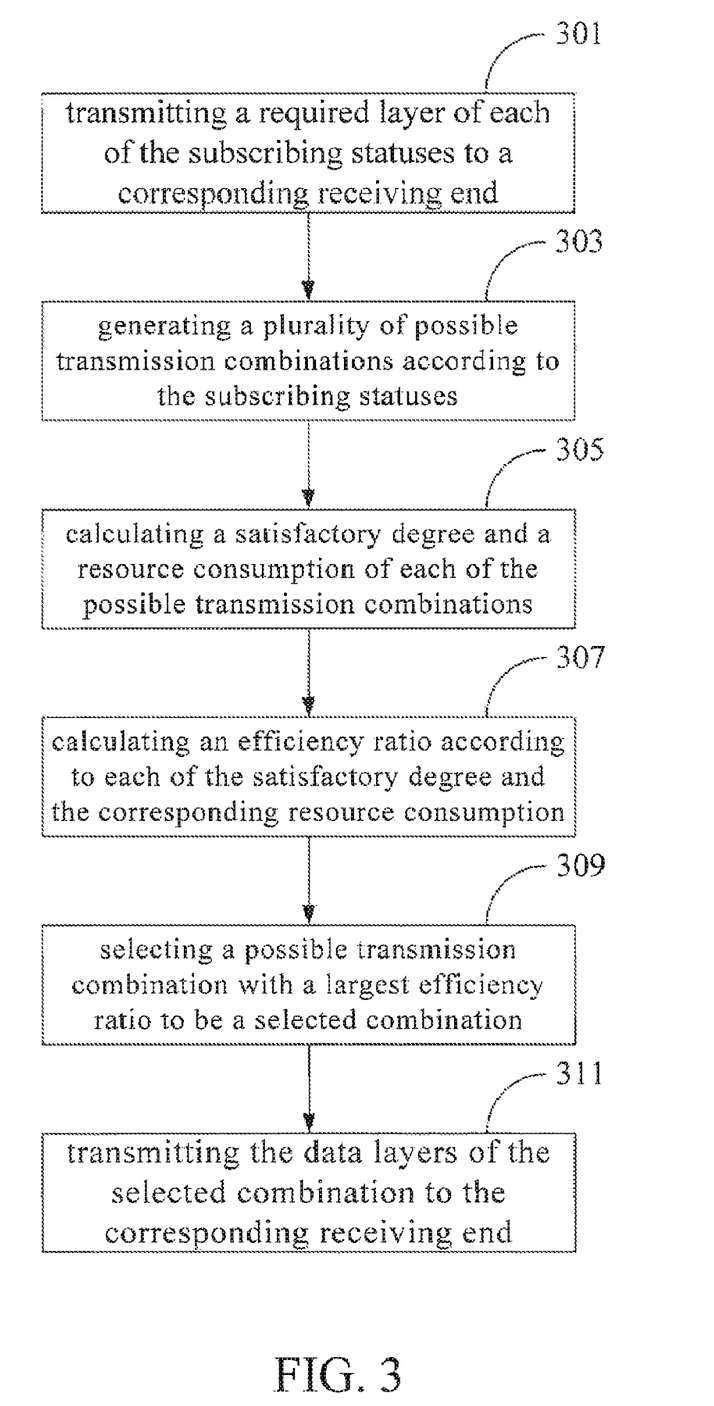
FIG. 3 is a flow chart of the second embodiment of the present invention.

A second embodiment of the present invention is shown in FIG. 3 which is a resource allocation method for transmitting a plurality of data streams to a plurality of receiving ends via a network resource, wherein each of the receiving ends has a subscribing status. Each of the data streams comprises a plurality of data layers. Each of the subscribing statuses is related to each of the data layers of each of the data streams. Each of the possible transmission combinations comprises at least one layer of the data layers, and each layer of the at least one layer is corresponding to the at least one of the receiving ends. This embodiment is applied to a base station adopting a WiMAX communication protocol to perform a wireless network multicast transmission. In other embodiments, the base station can also use other network communication protocols, and the transmission ways can be either unicast or broadcast.

At first, the second embodiment executes step 301 to transmit a required layer of each of the subscribing statuses to a corresponding receiving end, wherein the data layers comprise the required layer. Specifically speaking, the required data layers received by each of the receiving ends are the data layers recorded in the corresponding subscribing statuses. Next step 303 is executed to generate a plurality of possible transmission combinations according to the subscribing statuses.

Step 305 is executed to calculate a satisfactory degree and a resource consumption of each of the possible transmission combinations. Specifically speaking, step 305 is executed to calculate the satisfactory degree according to the equation of $$\sum_{k=1}^{N_i} (u_k^i \times n_k^i),$$

wherein k denotes an index of the at least one layer of the data layers of each of the possible transmission combinations, $N_i$ denotes a number of the at least one layer of each of the possible transmission combinations, i denotes an index of each of the possible transmission combinations, $u_k^i$ denotes a weight of each of the at least one layer of each of the possible transmission combinations, $n_k^i$ denotes a number of the receiving ends corresponding to each of the at least one layer of each of the possible transmission combinations. The aforementioned weight $u_k^i$ relates to a PSNR, and the aforementioned value of $n_k^i$ relates to a receiving ability of each of the receiving ends, i.e., the receiving ability relates to the channel status corresponding to each of the receiving ends, and the channel status relates to a SNR. In other embodiments, the weight $u_k^i$ can be determined according to one of a MOS, a sampling rate of pixels of image/video frames of a program, a quality of image/video frames of the program, or a combination thereof. The receiving ability can be determined according to one of a burst profile, a codec information, or a combination thereof.

Step 307 is executed to calculate an efficiency ratio according to each of the satisfactory degree and the corresponding resource consumption, wherein the resource consumption is less than the network resource. Step 307 calculates the efficiency ratio of corresponding resource consumption and each of the satisfactory degrees according to the following equation:

$$R_i = \frac{\left| \sum_{k=1}^{N_i} (u_k^i \times n_k^i) \right|}{B_i},$$

wherein $R_i$ denotes the efficiency ratio of each of the possible transmission combinations, $$\sum_{k=1}^{N_i} (u_k^i \times n_k^i)$$

represents the satisfactory degree of each of the possible transmission combinations, and $B_i$ deontes the resource consumption of each of the possible transmission combinations, wherein the resource consumption relates to a bandwidth or a number of time slots.

Step 309 is then executed to select a possible transmission combination with a largest efficiency ratio $R_i$ as a selected combination. Finally, step 311 is executed to transmit the data layers of the selected combination to the corresponding receiving end.

In addition to the steps shown in FIG. 3, the second embodiment can execute all operations or functions mentioned in the first embodiment. People skilled in the art can directly understand how the second embodiment executes the operations and functions based on said first embodiment. Consequently, descriptions for the operations and functions are redundant to be repeated here.

A third embodiment of the present invention is another resource allocation method for transmitting a plurality of data streams to a plurality of receiving ends via a network resource, wherein each of the receiving ends has a subscribing status. The method is applied to the resource allocation apparatus 21 of the first embodiment. This embodiment performs a wireless network multicast transmission via a WiMAX technique.

Step 301 is executed first to enable the transmission module 217 to transmit a required layer of each of the subscribing statuses to a corresponding receiving end, and the data layers comprise the required layer. Step 303 is executed to enable the generation module 211 to generate a plurality of possible transmission combinations according to the subscribing statuses. Step 305 is executed to enable the calculation module 213 to calculate a satisfactory degree and a resource consumption of each of the possible transmission combinations, and the calculation method is the same as the aforementioned embodiments and gives no unnecessary details here. Step 307 is executed to enable by the calculation module 213 to calculate an efficiency ratio according to each of the satisfactory degree and the corresponding resource consumption, wherein the resource consumption is less than the network resource and the calculation method is the same as the aforementioned embodiments and gives no unnecessary details here. Step 309 is then executed to enable the selection module 215 to select a possible transmission combination with a largest efficiency ratio to be a selected combination. Finally, step 311 is executed to enable the transmission module 217 to transmit, the data layers of the selected combination to the corresponding receiving end.

In addition to the aforementioned steps, the third embodiment can execute all operations or functions mentioned in the first embodiment. People skilled in the art can directly understand how the third embodiment executes the operations and functions based on said first embodiment. Consequently, descriptions for the operations and functions are redundant to be repeated here.

The aforementioned method can be realized via application programs, i.e., the resource allocation apparatus can be installed with the appropriate application programs to execute aforementioned methods. The application programs can be carried on computer readable medium. The computer readable medium can be a floppy disk, a hard disk drive, an optical disc, a flash disk, a tape, a database accessible from a network or any storage medium with the same functionality that can be easily thought by people skilled in the art.

Although the aforementioned embodiments adopt, the WiMAX technique, the present invention does not limit to this. That is, the present invention can be applied to other wireless network transmission services with a central control mechanism to perform information transmission of unicast, multicast, or broadcast of multimedia and other data. In addition to IPTV, the present invention is also suitable for other implementation types of a real-time or non-real-time streaming codec (such as TV, video, audio, etc.) with one to multiple layers.

Based on the overall network, resource, the network channel statuses of the receiving ends, and characteristics of the data streams (channel characteristics), the present invention is able to adjust the data layers of the data streams to be transmitted to the receiving ends dynamically to maximize an efficiency function of the whole network. The present invention utilizes limited network resource to achieve most efficient resource allocation for network and to avoid resource waste of the wireless broadcast resource. Thus, high flexibility for the system and high efficiency for the resource can be achieved.

The above disclosure is related to the detailed technical contents and inventive features thereof. People skilled in this field may proceed with a variety of modifications and replacements based on the disclosures and suggestions of the present invention as described without departing from the characteristics thereof. Nevertheless, although such modifications and replacements are not fully disclosed in the above descriptions, they have substantially been covered in the following claims as appended.

What is claimed is:

1. A resource allocation apparatus for transmitting a plurality of data streams to a plurality of receiving ends via a network resource, each of the receiving ends having a subscribing status, the resource allocation apparatus comprising:
a generation module for generating a plurality of possible transmission combinations according to the subscribing statuses, wherein each of the data streams comprises a plurality of data layers, each of the subscribing statuses comprises at least one layer of the data layers of one of the data streams received by the corresponding receiver, each of the possible transmission combinations comprises at least one layer of the data layers of the data streams other than the data layers comprised in the subscribing statuses of the receiving ends, and each layer of the at least one layer is corresponding to the at least one of the receiving ends;
a calculation module for calculating a satisfactory degree and a resource consumption of each of the possible transmission combinations and for calculating an efficiency ratio according to each of the satisfactory degree and the corresponding resource consumption, wherein the resource consumption is less than the network resource, and the satisfactory degree is calculated according to an equation $\Sigma_{k=1}^{Ni}(u_k^i \times n_k^i)$, wherein i is an index of each of the possible transmission combinations, k is an index of the at least one layer of each of the possible transmission combinations, $N_i$ is a number of the at least one layer of each of the possible transmission combinations, $u_k^i$ is a weight of each of the at least one layer of each of the possible transmission combinations, and $n_k^i$ is a number of the receiving ends corresponding to each of the at least one layer of each of the possible transmission combinations;
wherein the calculation module calculates the efficiency ratio of each of the possible transmission combinations according to the following equation:

$$R_i = |\Sigma_{k=1}^{Ni}(u_k^i \times n_k^i)|/B_i$$

wherein $R_i$ is the efficiency ratio of each of the possible transmission combinations, and $B_i$ is the resource consumption of each of the possible transmission combinations;
a selection module for selecting a possible transmission combination with a largest efficiency ratio to be a selected combination; and
a transmission module for transmitting the data layers of the selected combination to the corresponding receiving end to improve an information quality of the corresponding receiving end.

2. The resource allocation apparatus of claim 1, wherein the transmission module further transmits a required layer of each of the subscribing statuses to a corresponding receiving end, and the data layers comprise the required layer.

3. The resource allocation apparatus of claim 1, wherein the weight $u_k^i$ is related to one of a peak signal to noise ratio (PSNR), a mean opinion score (MOS), and a combination thereof.

4. The resource allocation apparatus of claim 1, wherein the number of the receiving ends $n_k^i$ is related to a receiving ability of each of the receiving ends.

5. The resource allocation apparatus of claim 4, wherein the receiving ability is related to a channel status.

6. The resource allocation apparatus of claim 5, wherein the channel status is related to one of a signal to noise ratio (SNR), a burst profile, and a combination thereof.

7. The resource allocation apparatus of claim 1, wherein the resource consumption $B_i$ is related to one of a bandwidth and a number of time slots.

8. The resource allocation apparatus of claim 1, wherein the resource allocation apparatus is adapted for one of a unicast, a multicast, and a broadcast of a wireless network.

9. The resource allocation apparatus of claim 1, wherein the resource allocation apparatus is adapted for a base station.

10. The resource allocation apparatus of claim 1, wherein the resource allocation apparatus transmits data layers via a worldwide interoperability for microwave access (WiMAX) technology.

11. A resource allocation method for transmitting a plurality of data streams to a plurality of receiving ends via a network resource, each of the receiving ends having a subscribing status, the resource allocation method comprising the following steps of:
generating a plurality of possible transmission combinations according to the subscribing statuses, wherein each of the data streams comprises a plurality of data layers, each of the subscribing statuses comprises at least one layer of the data layers of one of the data streams received by the corresponding receiver, each of the possible transmission combinations comprises at least one layer of the data layers of the data streams other than the data layers comprised in the subscribing statuses of the receiving ends, and each layer of the at least one layer is corresponding to the at least one of the receiving ends;

calculating a satisfactory degree and a resource consumption of each of the possible transmission combinations;

calculating an efficiency ratio according to each of the satisfactory degree and the corresponding resource consumption, wherein the resource consumption is less than the network resource, and the satisfactory degree is calculated according to an equation $\Sigma_{k=1}^{Ni}(u_k^i \times n_k^i)$, wherein i is an index of each of the possible transmission combinations, k is an index of the at least one layer of each of the possible transmission combinations, $N_i$ is a number of the at least one layer of each of the possible transmission combinations, $u_k^i$ is a weight of each of the at least one layer of each of the possible transmission combinations, and $n_k^i$ is a number of the receiving ends corresponding to each of the at least one layer of each of the possible transmission combinations;

wherein the efficiency ratio is calculated according to the following equation:

$$R_i = |\Sigma_{k=1}^{Ni}(u_k^i \times n_k^i)|/B_i$$

wherein $R_i$ is the efficiency ratio of each of the possible transmission combinations, and $B_i$ is the resource consumption of each of the possible transmission combinations;

selecting a possible transmission combination with a largest efficiency ratio to be a selected combination; and transmitting the data layers of the selected combination to the corresponding receiving end to improve an information quality of the corresponding receiving end.

12. The resource allocation method of claim 11, further comprising the step of transmitting a required layer of each of the subscribing statuses to a corresponding receiving end, wherein the data layers comprise the required layer.

13. The resource allocation method of claim 11, wherein the weight $u_k^i$ is related to one of a peak signal to noise ratio (PSNR), a mean opinion score (MOS), and a combination thereof.

14. The resource allocation method of claim 11, wherein the number of the receiving ends $n_k^i$ is related to a receiving ability of each of the receiving ends.

15. The resource allocation method of claim 14, wherein the receiving ability is related to a channel status.

16. The resource allocation method of claim 15, wherein the channel status is related to one of a SNR, a burst profile, and a combination thereof.

17. The resource allocation method of claim 11, wherein the resource consumption $B_i$ is related to one of a bandwidth and a number of time slots.

18. A non-transitory computer readable storage medium for storing an application program, the application program controlling the resource allocation apparatus to execute a resource allocation method, the resource allocation method transmitting a plurality of data streams to a plurality of receiving ends via a network resource, each of the receiving ends having a subscribing status, the resource allocation method comprising the following steps of:

generating a plurality of possible transmission combinations according to the subscribing statuses, wherein each of the data streams comprises a plurality of data layers, each of the subscribing statuses comprises at least one layer of the data layers of one of the data streams received by the corresponding receiver, each of the possible transmission combinations comprises at least one layer of the data layers of the data streams other than the data layers comprised in the subscribing statuses of the receiving ends, and each layer of the at least one layer is corresponding to the at least one of the receiving ends;

calculating a satisfactory degree and a resource consumption of each of the possible transmission combinations and calculating an efficiency ratio according to each of the satisfactory degree and the corresponding resource consumption, wherein the resource consumption is less than the network resource, and the satisfactory degree is calculated according to an equation $\Sigma_{k=1}^{Ni}(u_k^i \times n_k^i)$, wherein i is an index of each of the possible transmission combinations, k is an index of the at least one layer of each of the possible transmission combinations, $N_i$ is a number of the at least one layer of each of the possible transmission combinations, $u_k^i$ is a weight of each of the at least one layer of each of the possible transmission combinations, and $n_k^i$ is a number of the receiving ends corresponding to each of the at least one layer of each of the possible transmission combinations;

wherein the efficiency ratio is calculated according to the following equation:

$$R_i = |\Sigma_{k=1}^{Ni}(u_k^i \times n_k^i)|/B_i$$

wherein $R_i$ is the efficiency ratio of each of the possible transmission combinations, and $B_i$ is the resource consumption of each of the possible transmission combinations;

selecting a possible transmission combination with a largest efficiency ratio to be a selected combination; and transmitting the data layers of the selected combination to the corresponding receiving end to improve an information quality of the corresponding receiving end.

19. The non-transitory computer readable storage medium of claim 18, wherein the resource allocation method further comprises the step of transmitting a required layer of each of the subscribing statuses to a corresponding receiving end, and the data layers comprise the required layer.

20. The non-transitory computer readable storage medium of claim 18, wherein the weight $u_k^i$ is related to one of a peak signal to noise ratio (PSNR), a mean opinion score (MOS), and a combination thereof.

21. The non-transitory computer readable storage medium of claim 18, wherein the number of the receiving ends $n_k^i$ is related to a receiving ability of each of the receiving ends.

22. The non-transitory computer readable storage medium of claim 21, wherein the receiving ability is related to a channel status.

23. The non-transitory computer readable storage medium of claim 22, wherein the channel status is related to one of a SNR, a burst profile, and a combination thereof.

24. The non-transitory computer readable storage medium of claim 18, wherein the resource consumption $B_i$ is related to one of a bandwidth and a number of time slots.

* * * * *